(12) United States Patent
Burazer et al.

(10) Patent No.: US 10,400,762 B2
(45) Date of Patent: Sep. 3, 2019

(54) METHOD AND DEVICE FOR OPERATING A PUMP

(71) Applicant: AVL LIST GMBH, Graz (AT)

(72) Inventors: Vedran Burazer, Graz (AT); Michael Buchner, Graz (AT); Georg Lichtenegger, Graz (AT)

(73) Assignee: AVL List GmbH, Graz (AT)

( * ) Notice: Subject to any disclaimer, the term of this patent is extended or adjusted under 35 U.S.C. 154(b) by 142 days.

(21) Appl. No.: 15/524,477

(22) PCT Filed: Nov. 5, 2015

(86) PCT No.: PCT/EP2015/075767
§ 371 (c)(1),
(2) Date: May 4, 2017

(87) PCT Pub. No.: WO2016/071427
PCT Pub. Date: May 12, 2016

(65) Prior Publication Data
US 2017/0335841 A1    Nov. 23, 2017

(30) Foreign Application Priority Data

Nov. 5, 2014  (AT) .............................. A 50807/2014

(51) Int. Cl.
*F04B 51/00*     (2006.01)
*G01F 25/00*     (2006.01)

(52) U.S. Cl.
CPC .......... *F04B 51/00* (2013.01); *G01F 25/0007* (2013.01)

(58) Field of Classification Search
None
See application file for complete search history.

(56) References Cited

U.S. PATENT DOCUMENTS 3,845,288 A    10/1974  Cornyn et al.
6,055,851 A *   5/2000  Tanaka .................. E02F 9/2235
                                                     73/40

(Continued)

FOREIGN PATENT DOCUMENTS

DE           4138477        5/1993
DE          20312986       11/2003

(Continued)

OTHER PUBLICATIONS

English Abstract of DE4138477.
English Abstract of EP 1508730 (DE20312986).
English Abstract of JPH04012179.

*Primary Examiner* — Peter J Macchiarolo
*Assistant Examiner* — Jermaine L Jenkins
(74) *Attorney, Agent, or Firm* — Dykema Gossett PLLC

(57) ABSTRACT

The invention relates to a method and to a device for calibrating a pump (1) provided in a pump line (6), the device comprising an actuator (2) for setting the pumping capacity of the pump (1), and a control unit (3). The device comprises a flow monitor (4) in the fuel line (6). The control unit (3) is designed to substantially steadily vary the controlled variable of the actuator (2), when starting the pump (1), up to the switch point (SP) of the flow monitor (4), and to ascertain and store a controlled variable associated with the respective switch point (SP), to ascertain a controlled variable difference value ($\Delta f$) between a reference controlled variable (fR) stored for the pump (1) and the flow monitor (4) and a calibration controlled variable (fK) ascertained during the calibration, and to calibrate the controlled variable of the actuator (2) of the pump (1) based on the controlled variable difference value ($\Delta f$).

11 Claims, 3 Drawing Sheets

(56) References Cited

U.S. PATENT DOCUMENTS

| | | | | |
|---|---|---|---|---|
| 6,216,456 B1* | 4/2001 | Mitchell | ............... | E02F 9/2217 |
| | | | | 417/212 |
| 9,835,485 B2* | 12/2017 | Tauch | ..................... | G01F 9/006 |
| 9,850,884 B2* | 12/2017 | Alexander | .............. | F04B 1/124 |
| 2007/0196213 A1 | 8/2007 | Parsons et al. | | |
| 2014/0030113 A1 | 1/2014 | Pines et al. | | |
| 2014/0318235 A1 | 10/2014 | Poole et al. | | |
| 2016/0177930 A1* | 6/2016 | Livoti | ..................... | F04B 13/00 |
| | | | | 417/274 |

FOREIGN PATENT DOCUMENTS

| | | |
|---|---|---|
| EP | 2667031 | 11/2013 |
| JP | S5375501 A | 7/1978 |
| JP | S59211752 A | 11/1984 |
| JP | 60-167189 | 11/1985 |
| JP | H0412179 | 1/1992 |
| JP | H07128110 A | 5/1995 |
| JP | 2012159277 A | 8/2012 |

* cited by examiner

METHOD AND DEVICE FOR OPERATING A PUMP

The invention relates to a method for operating a pump, and in particular a measurement circuit pump for measuring the fuel consumption on an engine test stand, wherein a flow monitor having a certain switch point is provided in the pump line. The invention furthermore relates to a device for calibrating a pump provided in a pump line, wherein the device comprises an actuator for setting the pumping capacity of the pump, and a control unit. The invention furthermore relates to the use of this device for ascertaining a maintenance and/or replacement point in time for a pump.

The delivery capacity of pumps as a function of the controlled variable, which is to say the control frequency provided by a frequency converter, decreases as wear increases. An accelerated drop in the delivery capacity may be indicative of an impending failure of the pump.

This can result in problems, in particular in the fuel supply for engine test stands. Conducting test runs on engine test stand is generally associated with high costs, wherein leasing of the test stand alone can incur large amounts every day. Some test runs may possibly extend over several weeks, wherein in general no option exists during the test run to maintain or replace certain test equipment, such as the measurement circuit pump for fuel supply of the engine. The failure of a single component toward the end of a test run may thus cause very high costs since the results of the terminated test are usually worthless, and the test has to be repeated. In this, not only the costs previously incurred for the test must be taken into consideration, but also the loss of time, which impacts the development duration. It is particularly aggravating if the cause for the termination of a test run, and the resulting costs, is due to the failure of a comparatively inexpensive component, such as the measurement circuit pump.

The measurement circuit pump is subjected to widely varying loads during different test runs, so that it is usually not possible to precisely indicate to what extent the wear of the pump has already progressed after a test run, or after multiple test runs. However, this poses a problem in two respects: First, the failure likelihood of the pump increases drastically starting with a certain level of wear, and second, the delivery volume of the pump decreases with progressing wear, and in the worst case it is even possible for a drop below the minimum amount defined by the developer or the test stand operator for the test run to go unnoticed. In both instances the test results are worthless, and it turns out later that the pump should have already been replaced before the test run.

So as to avoid these risks, the measurement circuit pump is often replaced after only approximately 30% of the target service life since it is not possible to establish the actual extent of wear of the pump from the outside. While this constitutes relatively expensive wastefulness, this is still less expensive than tolerating the costs that must be defrayed in the event of a failure.

So as to avoid these disadvantages, it would be possible to provide a complex sensor system in the fuel supply systems so as to ascertain the actual degree of wear of the pump, such as by measuring the pressure, density and delivery volume. This, however, is associated with considerable costs, and moreover the installation of high-quality sensors may possibly further increase the potential problems, since, in addition to the higher costs for the pump unit, regular maintenance and timely replacement of not only the pump, but also of the sensor system are required. As a result of the considerable need for maintenance, the costs for the work involved also rise. Flow rate sensors, for example, can also cause additional pressure build-up, which must be taken into consideration separately.

A need therefore exists for methods and devices that allow the actual degree of wear of pumps to be ascertained in a simple manner, at low costs and with high operational reliability, so as to calibrate the pump prior to use such that the intended delivery volume is achieved, and additionally so as to be able to determine the degree of wear of the pump with sufficient precision to be able to replace the pump in a timely manner prior to failure.

In addition to the degree of wear and deterioration (such as of the bearings, gear wheels, and the like) of the pump, which influences the delivery volume of the same, the delivery volume of customarily used pumps is also very highly dependent on the pressure and the viscosity of the pumped medium. In the absence of complex sensors for monitoring the instantaneous delivery volume, in the worst case a drop below the minimum amount defined by the developer/test stand operator for the fuel supply may go unnoticed, in particular when one or more of the three essential influencing factors, these being the pressure and viscosity of the fuel and the wear of the pump, have changed. The results of such test series would then be unusable.

It is thus the object of the invention, among other things, to enable a calibration system, by way of which these factors can be compensated, so that the fuel supply can be reliably and easily corrected when conditions change, so that, during operation, the fuel amount actually supplied to the engine can always be maintained in accordance with the specifications.

This goal, and other goals, are achieved by the above-described method, comprising the following steps:
  in advance, when the pump is new, ascertaining once a reference controlled variable for an actuator of the pump by
    starting the pump by substantially steadily varying the controlled variable of the actuator up to the switch point; and
    ascertaining a controlled variable associated with the switch point, and storing this controlled variable as the reference controlled variable;
  prior to use of the pump, carrying out a calibration step on the same pump by:
    starting the pump by substantially steadily varying the controlled variable of the actuator up to the switch point;
    ascertaining a controlled variable associated with the switch point, and defining this controlled variable as the calibration controlled variable;
    ascertaining a controlled variable difference value between the reference controlled variable stored for the pump and the flow monitor and the calibration controlled variable; and
    calibrating the actuator of the pump based on the controlled variable difference value.

The method according to the invention takes advantage of the fact that the switch point of a simple flow monitor hardly changes over time and is also substantially independent of the pressure of the pumped medium. Even very simple and cost-effective flow monitors have very reliable switch points over the course of time. Moreover, a flow monitor or flow switch is very cost-effective to implement and requires only very little space. A flow monitor additionally has only little impact on the flow behavior of the pumped medium.

In particular, the frequency of a frequency converter of the pump may be considered the controlled variable, wherein a frequency converter is used as the actuator for the pump. However, the invention may also be used in another manner known to a person skilled in the art, using different actuators.

The "controlled variable associated with the switch point" or "switch point controlled variable" refers to the respective controlled variable of the actuator, which is to say the frequency of the frequency converter, for example, at which the flow monitor begins to detect the presence of a flow.

The expression "substantially steadily varying the controlled variable" denotes a variation of the controlled variable that brings about a sufficiently slow increase in the delivery capacity, which is to say of the flow rate, of the pump so as to be able to ascertain the switch point of the flow monitor with the accuracy predefined for the application. In particular, a gradual variation of the controlled variable may be considered to be "substantially steady" if the steps are small enough to determine the switch point with sufficient precision.

It is not essential for carrying out the invention to have precise knowledge of the exact flow value at which the flow monitor switches, as long as the switch point of a certain flow monitor always remains constant. It is thus not necessary for carrying out the method according to the invention to calibrate the flow monitor.

Typically, the reference controlled variable for the new pump is ascertained after the new pump has been installed, and this is then used for calibration over the entire life cycle of the pump. The calibration step is carried out prior to every renewed use, such as a new test run of an engine test stand, wherein the respective pump characteristic curve, via which the amount of fuel to be delivered is controlled as a function of the controlled variable, can be corrected for the use based on the ascertained controlled variable difference value. Should the ascertained controlled variable difference value fall outside a reference range ascertained for the proper operation of the pump, the pump can be replaced in a timely manner prior to starting the test run. A suddenly occurring change in the controlled variable difference value in a range that is still permitted may also be indicative of a faulty pump.

While the switch point of a flow monitor is influenced only insignificantly by the pressure of the medium, and also hardly changes over time, the switch point is dependent on the density and the viscosity of the fuel. According to the invention, advantageously the density and/or the viscosity of the pumped medium can thus be ascertained via a density and/or viscosity sensor, and the difference between the density and/or viscosity of the medium during the ascertainment of the reference controlled variable and the density and/or viscosity of the medium during the calibration step can be taken into consideration in the calibration of the actuator. In this way, the method according to the invention can also be used on the same piece of equipment and using the same previously ascertained reference controlled variable (and a reference density) for the calibration of pumps that are used to pump changing media having differing densities. The relationship between the switch point of a flow monitor and the viscosity of the monitored fluid is usually strictly linear and can be easily derived from the data sheet of the flow monitor. The switch point of the flow monitor may be fixedly predefined or be settable.

In a further advantageous embodiment, a wear value identifying the wear of the pump may be ascertained during the calibration step based on the controlled variable difference value. This simplifies the monitoring of the wear state of the pump.

Advantageously, a replacement point in time can be ascertained for the pump based on the wear value. The wear value can be a percentage of the target service life of the pump, for example, wherein this value, in conjunction with the planning data of a certain test run, can be used to ascertain a failure likelihood for the pump during this test run. When the failure likelihood exceeds a predetermined limit, the pump can be replaced prior to starting the test run.

The invention furthermore relates to a device of the type mentioned above, comprising a flow monitor in the fuel line, wherein the control unit is designed to substantially steadily vary the controlled variable of the actuator, when starting the pump, up to the switch point of the flow monitor, and to ascertain and store a controlled variable associated with the respective switch point, to ascertain a controlled variable difference value between a reference controlled variable stored for the pump and the flow monitor and a calibration controlled variable ascertained during the calibration, and to calibrate the controlled variable of the actuator of the pump based on the controlled variable difference value. The method according to the invention can be implemented in practice by way of such a device.

In an advantageous embodiment of the invention, the flow monitor can be integrated into the pump. In this way, an extremely compact pump system can be achieved.

Advantageously, the flow monitor may be a binary sensor. A binary sensor in connection with the present description shall be understood to mean a sensor that is capable of measuring exactly two states, these being "flow present" and "no flow detected." Despite the simplicity of this sensor, which also advantageously affects the costs, the advantages according to the invention can be achieved thereby.

According to a further embodiment, the flow monitor can be provided on the pressure side of the pump. This is advantageous since the flow resistance caused by the flow monitor on the suction side can result in cavitations due to underpressure as a function of the particular pumped medium.

In an advantageous embodiment, the device can comprise a density sensor and/or a viscosity sensor for the pumped medium. This embodiment is advantageous in particular for equipment in which differing pump media, such as differing fuels, having differing densities or viscosities must be pumped.

The device according to the invention allows a reliable calibration of the pump, without having to ascertain the delivery volume of the pump separately by way of a complex flow rate measurement. Advantageously, the device can be a fuel consumption measuring device for an engine test stand, wherein the pump can be a fuel pump, and in particular a measurement circuit pump provided in a measurement circuit of the fuel consumption measuring device. On test stands, the amount of fuel supplied to the engine can thus be precisely controlled or monitored at any time. This simplifies the design, lowers the costs for the test stand as well as the maintenance costs, and decreases the susceptibility of the equipment to faults.

Another advantage of the device according to the invention is the small dimensions thereof. This is relevant in particular in the case of test stands, since the maximum dimensions of the measuring devices are often predefined. Given the reduced available space, it would thus often not even be possible to install a complex sensor system for the measurement circuit pump.

Finally, the invention relates to the use of an above-described device according to the invention for ascertaining a maintenance and/or replacement point in time for the pump. According to the invention, this allows optimal maintenance strategies to be ascertained, wherein it is also possible to include complex algorithms for calculating the failure risk and/or the costs of a failure to be expected in the maintenance planning process.

The present invention will be described in more detail hereafter with reference to FIGS. 1 to 3, which show advantageous embodiments of the invention by way of example and in a schematic and non-limiting manner. In the drawings.

Figure 1:
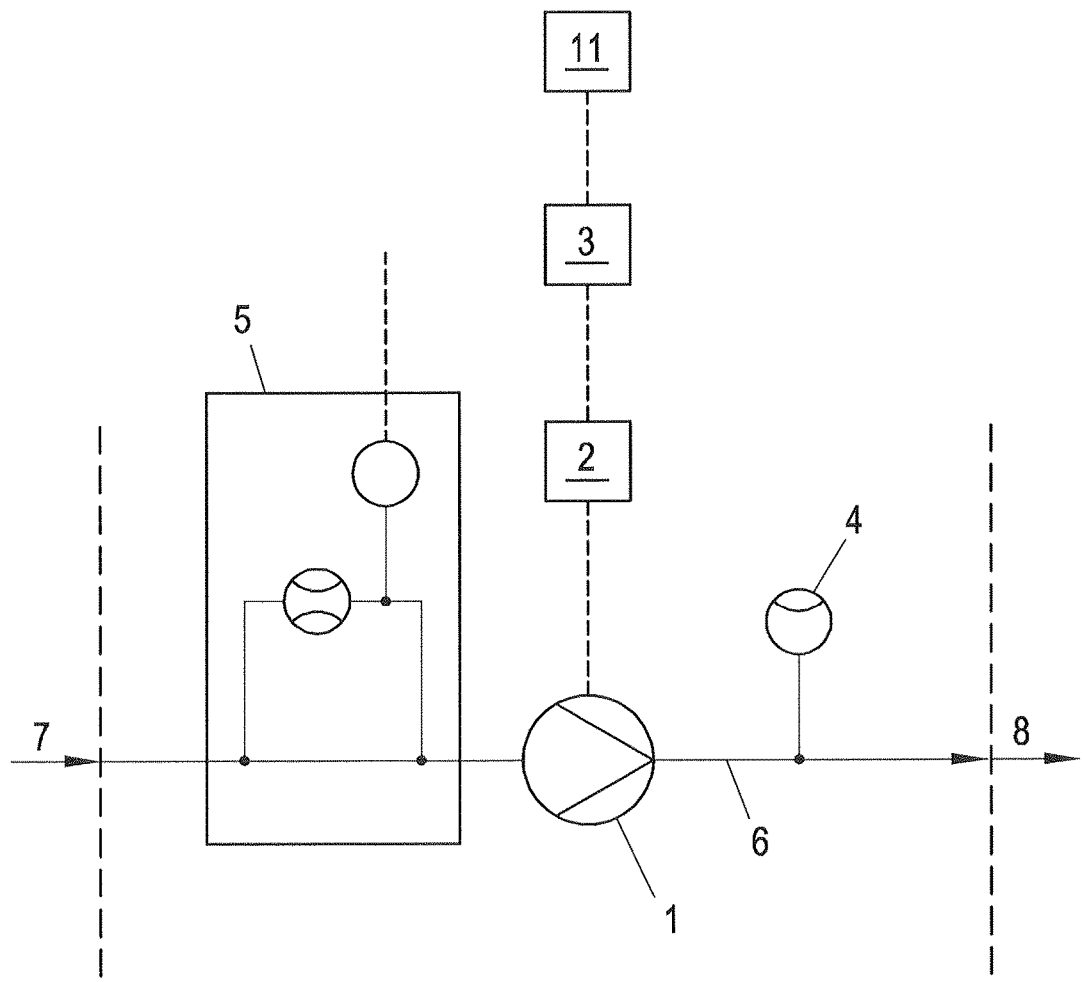
FIG. 1 shows a schematic illustration of the essential elements of the device according to the invention.

FIG. 1 shows a device according to the invention in a simplified schematic illustration, wherein a pump 1 pumps a medium to be pumped in a pump line 6 from a media source 7 to a media destination 8. "Pump line" in connection with the present description denotes the line in which the pump is disposed and through which the pump pumps the medium to be pumped. The pump line may also be routed in a circuit, as is customary with heating systems, for example.

The pump 1 is connected to an actuator 2, wherein the actuator 2 predefines a controlled variable which determines the delivery capacity of the pump 1. The controlled variable can be a frequency, for example, and the actuator 2 can be a frequency converter.

A density sensor 5 is provided upstream of the pump in the pump line 6, wherein it is also possible for a viscosity sensor to be provided instead of the density sensor 5, or in addition to the same.

A flow monitor 4 is provided downstream of the pump. The flow monitor 4 can be a conventional flow switch comprising a paddle disposed in the fuel line, wherein the paddle is pushed to the side by the flow and triggers a switch in the process when the flow exceeds a certain threshold value (this defines the above-mentioned switch point of the flow monitor). It is also possible to use flow monitors that are based on a different principle; the illustrated design, however, represents a particularly simple and cost-effective solution, which has the advantage of having very reliable switch points (which is to say, the flow velocity or the flow rate at which the flow monitor switches hardly changes over the service life).

A control unit 3 is connected to the actuator 2, the flow monitor 4 and the density sensor 5. From the density sensor 5 (and possibly the viscosity sensor), the control unit 3 receives signals identifying the density (and the viscosity). Furthermore, the control unit 3 receives signals from the flow monitor 4 which identify the presence or the absence of a flow in the pump line 6. The control unit 3 can control the controlled variable of the actuator 2. The parameters of the control unit 3 can be set by a user via a user interface 11. For example, it is also possible to enter parameters for the density and/or the viscosity of the medium to be pumped via the user interface 11, if no density sensor 5 or no viscosity sensor is present in the equipment.

Figure 2:
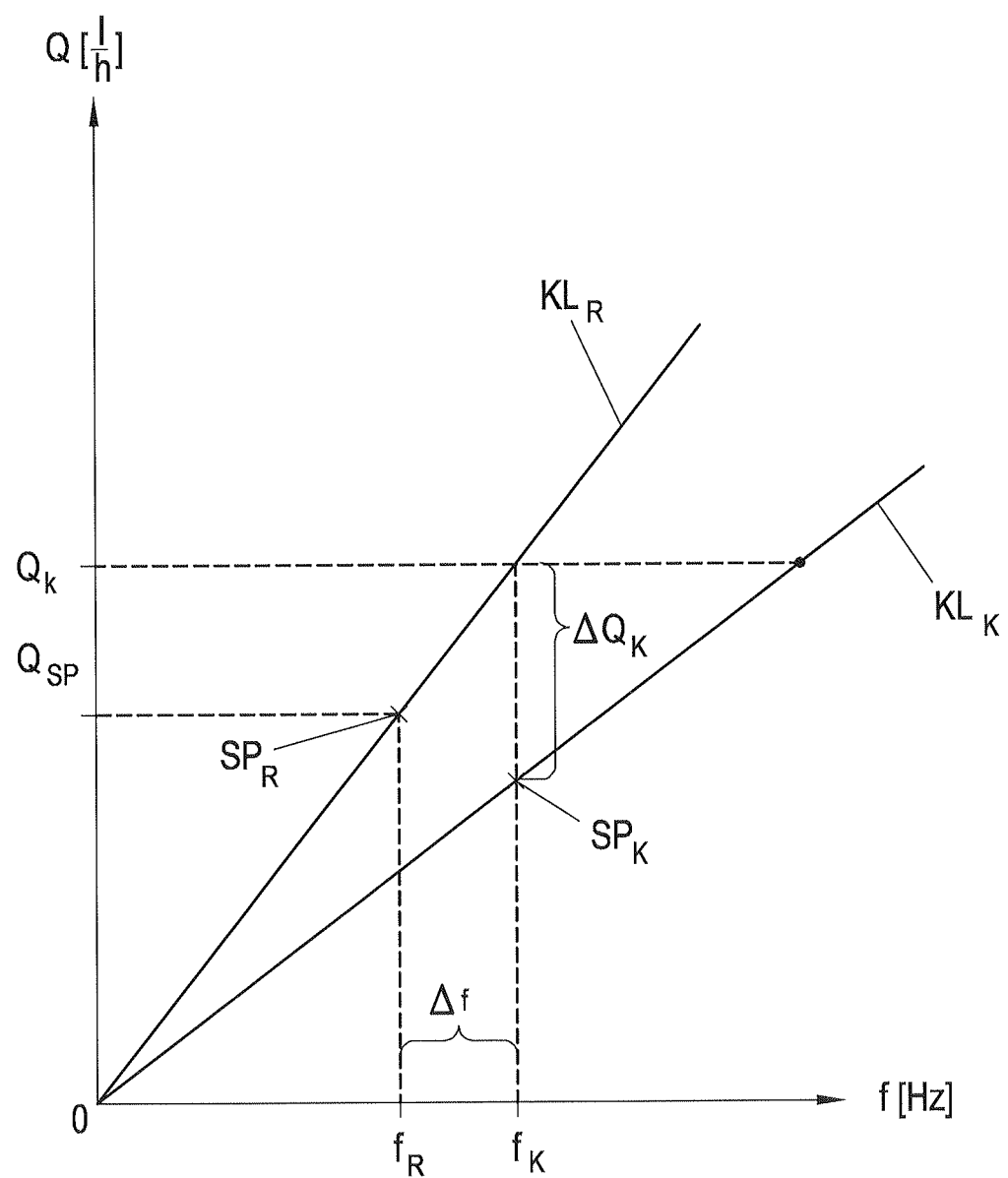
FIG. 2 shows a schematic illustration of a device according to the invention for fuel consumption measurement for an engine test stand.

The method according to the invention for operating a pump will now be described in greater detail with reference to FIG. 2. FIG. 2 shows a diagram in which the flow rate Q in liters per hour (y axis) is plotted against the frequency f of the frequency converter of a pump in Hertz (x axis).

So as to ascertain a reference controlled variable $f_R$, the frequency of the frequency converter is steadily (or substantially steadily) increased, after the installation of a new pump, starting from a stopped state of the pump, and the frequency $f_R$ starting at which the flow monitor detects a flow is ascertained, wherein this point is referred to as the switch point $SP_R$. The flow rate associated with this switch point is denoted by $Q_{SP}$. The switch point $SP_R$ is located on the characteristic curve $KL_R$ of the new pump, wherein the characteristic curve $KL_R$ is usually know from the data sheet of the pump and can be ascertained in advance. The delivery capacity of the pump is established by setting the frequency which corresponds to the desired delivery capacity, wherein the relationship between the control frequency and the flow rate volume is defined by the characteristic curve $KL_R$.

Based on the known characteristic curve $KL_R$, it would generally be easy to ascertain the exact value $Q_{sp}$ for the switch point flow rate of the flow monitor; however, precise knowledge of this value is not required for the further steps of the calibration. During the one-time step for ascertaining the reference frequency conducted in advance, only the value of the reference frequency $f_R$ is stored, and this is used subsequently for the same combination of pump and flow monitor.

Prior to every renewed use of the device, for example on an engine test stand prior to every new test run, the pump is calibrated with the aid of the stored values for the reference frequency $f_R$. For calibration, the pump, as was already done for the ascertainment of the reference frequency, is started up in a ramp-like manner by steadily (or at least substantially steadily) increasing the frequency of the frequency converter, and the calibration frequency $f_K$ is ascertained, which in the illustrated case is higher than the reference frequency $f_R$. (The corresponding switch point is denoted by $SP_K$ in FIG. 2 and corresponds to the same flow rate $Q_{sp}$ as the reference switch point $SP_R$.)

The frequency difference $\Delta f$ between the stored reference frequency $f_R$ and the calibration frequency $f_K$ ascertained during calibration (where $\Delta f = f_R - f_K$) now shows that the instantaneous characteristic curve $KL_K$ of the pump differs from the characteristic curve $KL_R$ of the new pump. If use of the pump were now to be continued using the original settings, a deviation $\Delta Q$ for the flow rate at this frequency would be obtained, which is dependent on the respective control frequency and must be compensated for prior to every test run by conducting a calibration. In FIG. 2, the deviation $\Delta Q_K$ of the flow rate is indicated at the calibration frequency $f_K$.

So as to calibrate the actuator, which is to say the frequency converter of the pump, the instantaneous characteristic curve $KL_K$ must be "shifted" toward the original characteristic curve $KL_R$ by adapting the control frequencies. Since the characteristic curve qualitatively does not differ (for the sake of simplicity, FIG. 2 shows both characteristic curves as straight lines passing through the origin), measuring only the calibration frequency $f_K$ suffices for the calibration of the entire progression of the characteristic curve. In the illustrated example, this can be easily reproduced by way of the relationship $Q_K/\Delta Q_K = f_K/\Delta f$.

The deviation of the respective calibrated characteristic curve $KL_K$ from the reference characteristic curve $KL_R$ may differ significantly from one test run to the next since this is influenced by the respective pressure of the pumped fuel and the degree of wear of the pump, wherein the value $Q_{SP}$ of the flow monitor for the switch point flow rate changes only insignificantly. In experiments, it was found that in practice a surprisingly precise calibration of the pump can even be achieved with very simple and cost-effective flow monitors.

Even though the switch point of a flow monitor hardly changes over time, and it is also influenced only insignificantly by the pressure of the medium, the switch point is still somewhat heavily dependent on the respective density and the viscosity of the fuel. So as to take this into consideration in the calibration, it is possible according to the invention to use a density sensor and/or a viscosity sensor so as to be able to take the change in the value $Q_{SP}$ for the switch point flow rate into consideration in the calibration.

The method according to the invention can be applied not only to pumps having linear characteristic curves, but may also be used for pumps in which the characteristic curve takes on a different form. For example, the characteristic curve may be curved in a convex or concave manner and/or include bends or points of discontinuity. The implementation of the method according to the invention for a different characteristic curve forms part of the knowledge of a person of average skill in the art.

Figure 3:
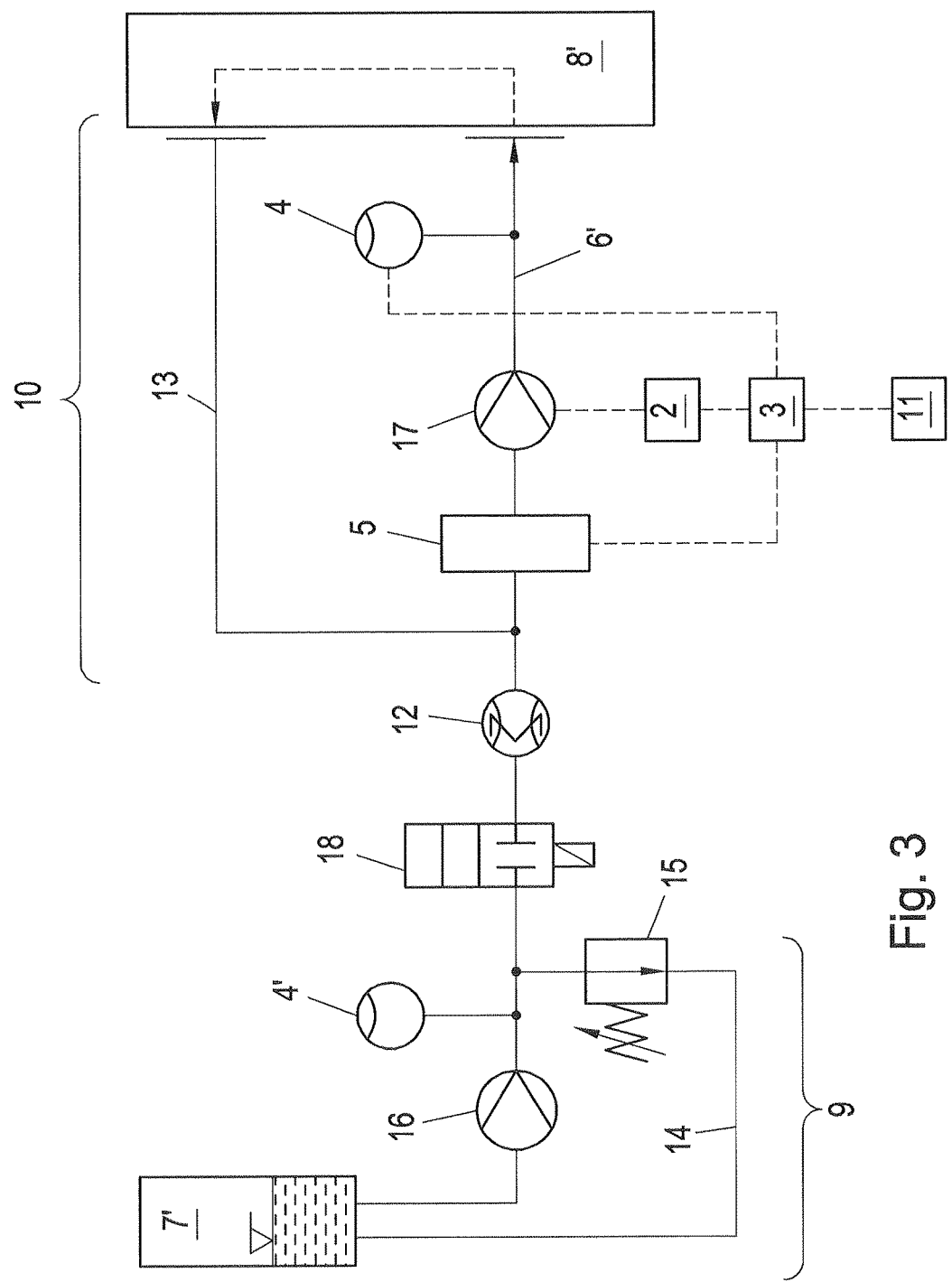
FIG. 3 shows a diagram having differing characteristic curves of a pump.

FIG. 3 shows the essential elements of a device for fuel consumption measurement for an engine test stand. An input circuit pump 16, a flow rate sensor 12 (such as a Coriolis sensor), a density sensor 5, a measurement circuit pump 17, and a flow monitor 4 are disposed in a fuel line 6', which leads from a fuel tank 7' to an item under test 8' (or the test engine). Due to its better response behavior, the flow monitor 4 is disposed on the pressure side of the measurement circuit pump 17.

The device illustrated in FIG. 3 can be divided into two circuits, these being an input circuit 9 between the fuel tank 7' and the flow rate sensor 12 provided in the fuel line 6', and a measurement circuit 10 between the flow rate sensor 12 and the item under test 8. In the input circuit 9, a tank return 14, which leads back into the fuel tank 7' and in which a return flow pressure regulator 15 is provided, branches off between the input circuit pump 16 and the flow rate sensor 12. In the measurement circuit 10, an engine return 13 is provided proceeding from the item under test 8', the engine return opening into the fuel line 6' between the flow rate sensor 12 and the density sensor 5.

In the illustrated schematic sketch, the density sensor 5 is disposed directly upstream of the measurement circuit pump 17 and the flow monitor 4. The density sensor 5, however, may be provided in any arbitrary other location, such as in the region of the tank 7 or on the engine 8. For simple embodiments, it is also possible to entirely dispense with a density sensor, in particular when no significant changes in the density of the fuel are to be expected, or when the density can be ascertained in another manner or entered via the user interface. In addition to or instead of the density sensor 5, a viscosity sensor may also be provided.

The viscosity and the density of the customarily used fuels are generally known or can be ascertained in advance by way of experimentation. If the type of fuel is known (such as diesel or gasoline), and the switch point has been determined once for all fluids by way of experimentation, it is possible to infer the fluid via the density and ascertain the exact switch point. If only the fluid having the minimum density and that having the maximum density are known, it is possible, based on the linear dependency of the dynamic viscosity on the density, to make a very good assessment as to where the switch point must be located. It is to be expected that this assessment is within the measuring accuracy, at least for liquids common in the automotive industry. A person skilled in the art will be able to adapt the invention to the respective fuel properties and the required measuring accuracy.

The input circuit pump 16 pumps the fuel from the fuel tank 7' and establishes a supply pressure in the region between the input circuit pump 16 and the measurement circuit pump 17, the supply pressure being limited by the return flow pressure regulator 15. If the item under test 8' does not consume any fuel and thus no fuel flows through the flow rate sensor 12, the fuel delivered by the input circuit pump 16 is pumped via the tank return 14 back into the tank 7'. In the measurement circuit 10, in turn, the fuel pumped by the measurement circuit pump 17 is supplied to the item under test 8' in the form of a steady flow. Fuel that is not consumed by the item under test 8' is returned via the engine return 13 back to the fuel line 6'.

The advantage of these two circuit systems composed of the input circuit 9 and the measurement circuit 10 is that the delivery capacities of the input circuit pump 16 and of the measurement circuit pump 17 can vary within a certain tolerance range, since the amount of fuel actually consumed by the item under test 8' can be ascertained very exactly via the very precise flow rate sensor 12, even if the amounts delivered by the input circuit pump 16 and the measurement circuit pump 17 are not exactly known. All that is needed is for the input circuit pump 16 and the measurement circuit pump 17 to each be able to make the necessary pressure increases available.

Depending on the type of item under test 8', it may be necessary for the measurement circuit pump 17 to also have to supply very high pressures, wherein, based on this load, defects generally occur on the measurement circuit pump 17, and not on the input circuit pump 16. While fluctuations in the delivery volume of the input circuit pump 16 or the measurement circuit pump 17 are unproblematic to a certain degree, an excessive drop in the delivery volume may prevent the item under test 8' from obtaining the required amount of fuel, or for the pressure of the fuel supplied to the item under test 8' to be too low. In this case, the results of a test run would be unusable.

Tests conducted by the applicant have shown that the pumping capacity of the measurement circuit pump 17, depending on the delivered medium, can deviate from the actual set value (such as 800 L/h) by 200 L/h as early as after one third of the target service life of the pump. This corresponds to a deviation of 25%. With the aid of the device according to the invention, this deviation can be limited with very low complexity to a value of less than 10% over the entire service life. Additionally, every calibration step enables a reliable evaluation of the actual wear of the pump.

The method according to the invention is carried out by the device according to FIG. 3 analogously to the above-described procedure, wherein, during the ramping up of the delivery capacity of the measurement circuit pump 17, the fuel is pumped in a loop in the measurement circuit 10.

So as to exactly ascertain the pumping capacity of the measurement circuit pump 17, it would also be possible to install a second flow rate sensor in the region of the measurement circuit, which is to say downstream of the measurement circuit pump 17, for example; however, the Coriolis sensors generally used for this purpose are very expensive and have the disadvantage that these influence the pressure of the fuel that is supplied to the item under test 8'. In practice, a second flow meter is thus not a useful option.

So as to be able to advantageously apply the method according to the invention also to the input circuit pump 16, the input circuit 9 in the illustrated embodiment comprises a dedicated flow monitor 4', wherein the input circuit 9 can be separated from the measurement circuit 10 by way of a check valve 18, so that all the fuel in the input circuit 9 is pumped via the return flow pressure regulator 15 and the tank return 14 in a loop back into the tank. The calibration can then also be carried out for the input circuit pump 9 analogously to the above-described method (the control devices, which is to say in particular an actuator and a control unit via which the input circuit pump is controlled, are not illustrated for the sake of clarity; a person skilled in the art, however, knows how to implement such controls in practice).

In connection with the present invention, arbitrary pumps may be used as pumps, having a pumping capacity that can be controlled with sufficient precision for the particular application by the actuator that is used. For example, such pumps include gear pumps, rotary vane pumps, rotary lobe pumps, rotary piston pumps or the like. In essence, the method according to the invention can advantageously be applied to any pump in which the delivery volume can be set in a variable manner. It is advantageous if the pump has a linear delivery volume/speed characteristic curve. However, this is not an absolute prerequisite.

The invention can be applied not only to a use in connection with fuel measurements of engine test stands, but also for other types of pumps. For example, the invention could also be used to monitor and correct the delivery capacity of pumps in heating circuits.

REFERENCE NUMERALS pump 1
actuator 2-frequency converter 2'
control unit 3
flow monitor 4, 4'
density sensor 5
pump line 6-fuel line 6'
media source 7-fuel tank 7'
media destination 8-item under test 8'
input circuit 9
measurement circuit 10
user interface 11
flow rate sensor 12
engine return 13
tank return 14
return flow pressure regulator 15
input circuit pump 16
measurement circuit pump 17
check valve 18

The invention claimed is:

1. A method for operating a pump, and in particular a measurement circuit pump for measuring fuel consumption on an engine test stand, wherein a flow monitor having a certain switch point (SP) is provided in the pump line, the method being characterized by the following steps:
in advance, when the pump is new, ascertaining once a reference controlled variable ($f_R$) for an actuator of the pump by
starting the pump by substantially steadily varying a controlled variable of the actuator up to the switch point (SP); and
ascertaining the controlled variable associated with the switch point (SP), and storing this controlled variable as the reference controlled variable ($f_R$);
prior to use of the pump, carrying out a calibration step on the same pump by:
starting the pump by substantially steadily varying the controlled variable of the actuator up to the switch point (SP);
ascertaining the controlled variable associated with the switch point (SP), and defining this controlled variable as the calibration controlled variable ($f_K$);
ascertaining a controlled variable difference value ($\Delta f$) between the reference controlled variable ($f_R$) stored for the pump and the flow monitor and the calibration controlled variable ($f_K$); and
calibrating the actuator of the pump based on the controlled variable difference value ($\Delta f$).

2. The method according to claim 1, wherein the density and/or the viscosity of the pumped medium are ascertained via a density and/or viscosity sensor, and the difference between the density and/or viscosity of the medium during the ascertainment of the reference controlled variable and the density and/or viscosity of the medium during the calibration step is taken into consideration in the calibration of the actuator.

3. The method according to claim 1, wherein a wear value identifying the wear of the pump is ascertained during the calibration step based on the controlled variable difference value ($\Delta f$).

4. The method according to claim 3, wherein a replacement point in time is ascertained for the pump based on the wear value.

5. A device for calibrating a pump (1) provided in a pump line (6), the device comprising an actuator (2) for setting the pumping capacity of the pump (1) and a control unit (3), wherein the device comprises a flow monitor (4) in the pump line (6), the control unit (3) being designed to
substantially steadily vary a controlled variable of the actuator (2), when starting the pump (1), up to the switch point (SP) of the flow monitor (4), and to ascertain and store a controlled variable associated with the respective switch point (SP);
ascertain a controlled variable difference value ($\Delta f$) between a reference controlled variable ($f_R$) stored for the pump (1) and the flow monitor (4) and a calibration controlled variable ($f_K$) ascertained during the calibration; and
calibrate the controlled variable of the actuator (2) of the pump (1) based on the controlled variable difference value ($\Delta f$).

6. The device according to claim 5, wherein the flow monitor (4) is integrated in the pump (1).

7. The device according to claim 5, wherein the flow monitor (4) is a binary sensor.

8. The device according to claim 5, wherein the flow monitor (4) is provided on the pressure side of the pump (1).

9. The device according to claim 5, wherein the device comprises a density sensor (5) and/or a viscosity sensor for the pumped medium.

10. The device according to claim 5, wherein the device is a fuel consumption measuring device for an engine test stand, wherein the pump (1) is a fuel pump, and in particular a measurement circuit pump (17) provided in a measurement circuit of the fuel consumption measuring device.

11. The use of a device according to claim 5 for ascertaining a maintenance and/or replacement point in time for a pump.

* * * * *